United States Patent
Ebe

(10) Patent No.: US 9,167,168 B2
(45) Date of Patent: Oct. 20, 2015

(54) IMAGE PROCESSING METHOD, IMAGE PROCESSING APPARATUS, NON-TRANSITORY COMPUTER-READABLE MEDIUM, AND IMAGE-PICKUP APPARATUS

(71) Applicant: CANON KABUSHIKI KAISHA, Tokyo (JP)

(72) Inventor: Hiroki Ebe, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 41 days.

(21) Appl. No.: 14/172,364

(22) Filed: Feb. 4, 2014

(65) Prior Publication Data

US 2014/0218557 A1 Aug. 7, 2014

(30) Foreign Application Priority Data

Feb. 4, 2013 (JP) .................................. 2013-019474

(51) Int. Cl.
| | |
|---|---|
| *H04N 5/235* | (2006.01) |
| *H04N 5/357* | (2011.01) |
| *H04N 5/232* | (2006.01) |
| *G06T 5/00* | (2006.01) |

(52) U.S. Cl.
CPC ......... *H04N 5/2351* (2013.01); *H04N 5/23229* (2013.01); *H04N 5/3572* (2013.01)

(58) Field of Classification Search
CPC .............. H04N 5/2351; H04N 5/3572; H04N 5/23229; G06T 5/003; G06T 5/002; G06T 5/004
USPC ............... 348/222.1, 349; 382/254, 255, 264, 382/274, 275
See application file for complete search history.

(56) References Cited

U.S. PATENT DOCUMENTS

| | | | |
|---|---|---|---|
| 7,990,429 B2 * | 8/2011 | Saito | 348/222.1 |
| 8,514,304 B2 | 8/2013 | Hatakeyama | |
| 2008/0079822 A1 | 4/2008 | Nojima | |
| 2011/0096366 A1 * | 4/2011 | Oka | 358/3.26 |
| 2011/0285879 A1 * | 11/2011 | Hatakeyama | 348/241 |

FOREIGN PATENT DOCUMENTS

| | | |
|---|---|---|
| JP | 11-041512 A | 2/1999 |
| JP | 2000-259823 A | 9/2000 |

(Continued)

OTHER PUBLICATIONS

Japanese Office Action dated Aug. 12, 2014 issued in corresponding Japanese Application No. 2013-019474.
Ng, Ren, et al.; "Light Field Photography with a Hand-held Plenoptic Camera"; Stanford Tech Report CTSR 2005-02, pp. 1-11.

(Continued)

*Primary Examiner* — Tuan Ho
*Assistant Examiner* — Marly Camargo
(74) *Attorney, Agent, or Firm* — Rossi, Kimms & McDowell LLP

(57) ABSTRACT

A non-transitory computer-readable medium for storing an image processing program configured to enable a computer to execute a shaping step of shaping an input image generated through capturing via an optical system by using a characteristic of the optical system and an image-pickup condition, a blurring step of blurring an image shaped in the shaping step, and a dividing step of dividing the input image into a plurality or layered images according to an object distance. The computer executes the shaping step based upon distance information of an object contained in each layered image.

8 Claims, 15 Drawing Sheets

(56) References Cited

FOREIGN PATENT DOCUMENTS

| | | |
|---|---|---|
| JP | 2002-247439 A | 8/2002 |
| JP | 2008109629 A | 5/2008 |
| JP | 2010-039448 A | 2/2010 |
| JP | 2012005056 A | 1/2012 |
| WO | 2011122284 A1 | 10/2011 |

OTHER PUBLICATIONS

Rosenfeld, Azriel, et al.; "Digital Picture Processing" Second Edition, vol. 1; 1982 Academic Press, Inc., San Diego, CA.; pp. 268-281.
Japanese Office Action cited in Japanese counterpart application No. JP2013019474, dated Nov. 11, 2014.

\* cited by examiner

SHAPING OR BLURRING FILTER

CAPTURED IMAGE

CAPTURED AND RESTORED IMAGE

LAYER 1

LAYER 2

LAYER 3

LAYER 1

LAYER 2

LAYER 3

COMBINED IMAGE
AFTER EACH LAYER IS BLURRED

CAPTURED IMAGE

INPUT IMAGE

SHAPED IMAGE

PRIOR ART

IMAGE PROCESSING METHOD, IMAGE PROCESSING APPARATUS, NON-TRANSITORY COMPUTER-READABLE MEDIUM, AND IMAGE-PICKUP APPARATUS

BACKGROUND OF THE INVENTION

1. Field of the Invention

The present invention relates to an image processing method, an image processing apparatus, a non-transitory computer-readable medium, and an image-pickup apparatus.

2. Description of the Related Art

An image captured through a wide-angle lens, an image captured by an image-pickup apparatus having a small image sensor size, and an image captured by an image-pickup apparatus having a small aperture diameter or a large F value has a deep depth of field with few blurs from a short-distant view to a long-distant view. In order to emphasize the main object and to relax the atmosphere, there have been proposed a variety of methods of blurring a captured image.

For example, Japanese Patent Laid-Open No. ("JP") 2000-259823 proposes a method for obtaining distance information at a plurality of focus detection points for auto focusing (AF) and for blurring an input image. JP 11-41512 proposes an averaging method of pixel values in a user specified area in order to blur an input image. A. Rosenfeld (author), Makoto Nagao (translator), "Digital Picture Processing," Kindai kagaku sha Co., Ltd. (1978), proposes a variety of image processing methods of correcting a deteriorated input image. Other prior art contain Ren Ng et al., "Light Field Photography with a Hand-Held Plenoptic Camera," Stanford Tech Report CTSR, February of 2005.

JP 2000-259823 and 11-41512 discuss methods of blurring the input image based upon the pixel value of the input image, but the pixel value of the input image is influenced by the optical characteristic of the image-pickup optical system regardless of the size of the image sensor and the focal length. An image shape formed on the image sensor is different from the object even at the in-focus position. At the in-focus position, the object in the periphery of the image is asymmetrically deformed due to the coma and the astigmatism. The image also deforms due to the diffraction. At a defocus position, the image deforms due to the vignetting in addition to the aberration and the diffraction. When a blur is added to an image that has deformed due blurring of the aberration, blurring of the diffraction, and blurring of vignetting, a blurring shape is unexpectedly different from one supposed by the object shape.

For example, if a circularly symmetrical blur is added to a captured image (input image) of an object illustrated in FIG. 19A, the blurring shape is as expected from the object shape, as illustrated in FIG. 19B. However, when the captured image is influenced by the coma, the captured image of the object illustrated in FIG. 19A deforms as illustrated in FIG. 19C. If circularly symmetrical blurring is applied to this image (the image of FIG. 19C), the blurring shape is subject to the coma as illustrated in FIG. 19D.

If the captured image is influenced by the astigmatism, the captured image illustrated in FIG. 19A deforms as extending in a specific direction. The image at the defocus position deforms due to blurring of the aberration and blurring of vignetting, for example, into an image lacking of part in the image illustrated in FIG. 19A. In other words, in order to obtain a good blurring shape as expected from the object shape, it is necessary to restrain image deformations caused by blurring of aberration, blurring of the diffraction, and blurring of vignetting.

FIG. 20A is a graph illustrating the partially saturated brightness in an input image. In each of FIGS. 20A to 20C, an abscissa axis denotes a space coordinate and an ordinate axis denotes a brightness value. Herein, the saturation value is defined as a maximum brightness value that can be expressed in a digital image. If a blur is added to the brightness distribution of the image illustrated in FIG. 20A in which the brightness is partially saturated in the input image, a curve of the brightness distribution will be milder as illustrated in FIG. 20B than that of FIG. 20A. FIG. 20C illustrates an image obtained with a smaller F value (or under a brighter condition) than that of the image of FIG. 20A in order to blur an image with a shallow depth of field. The image illustrated in FIG. 20B is darker than that of FIG. 20C because the brightness is reduced. In other words, blurring cannot be well reproduced in an area of the brightness saturated part in an image captured with a small F value simply by blurring the input image.

SUMMARY OF THE INVENTION

The present invention provides an image processing method, an image processing apparatus, a non-transitory computer-readable medium, and an image-pickup apparatus, which can generate a satisfactorily image.

A non-transitory computer-readable medium for storing an image processing program configured to enable a computer to execute a shaping step of shaping an input image generated through capturing via an optical system by using a characteristic of the optical system and an image-pickup condition, a blurring step of blurring an image shaped by the shaping step, and a dividing step of dividing the input image into a plurality or layered images according to an object distance. The computer executes the shaping step based upon distance information of an object contained in each layered image.

Further features of the present invention will become apparent from the following description of exemplary embodiments with reference to the attached drawings.

DESCRIPTION OF THE EMBODIMENTS

A description will now be given of embodiments according to the present invention with reference to the accompanying drawings.

First Embodiment

Figure 1:
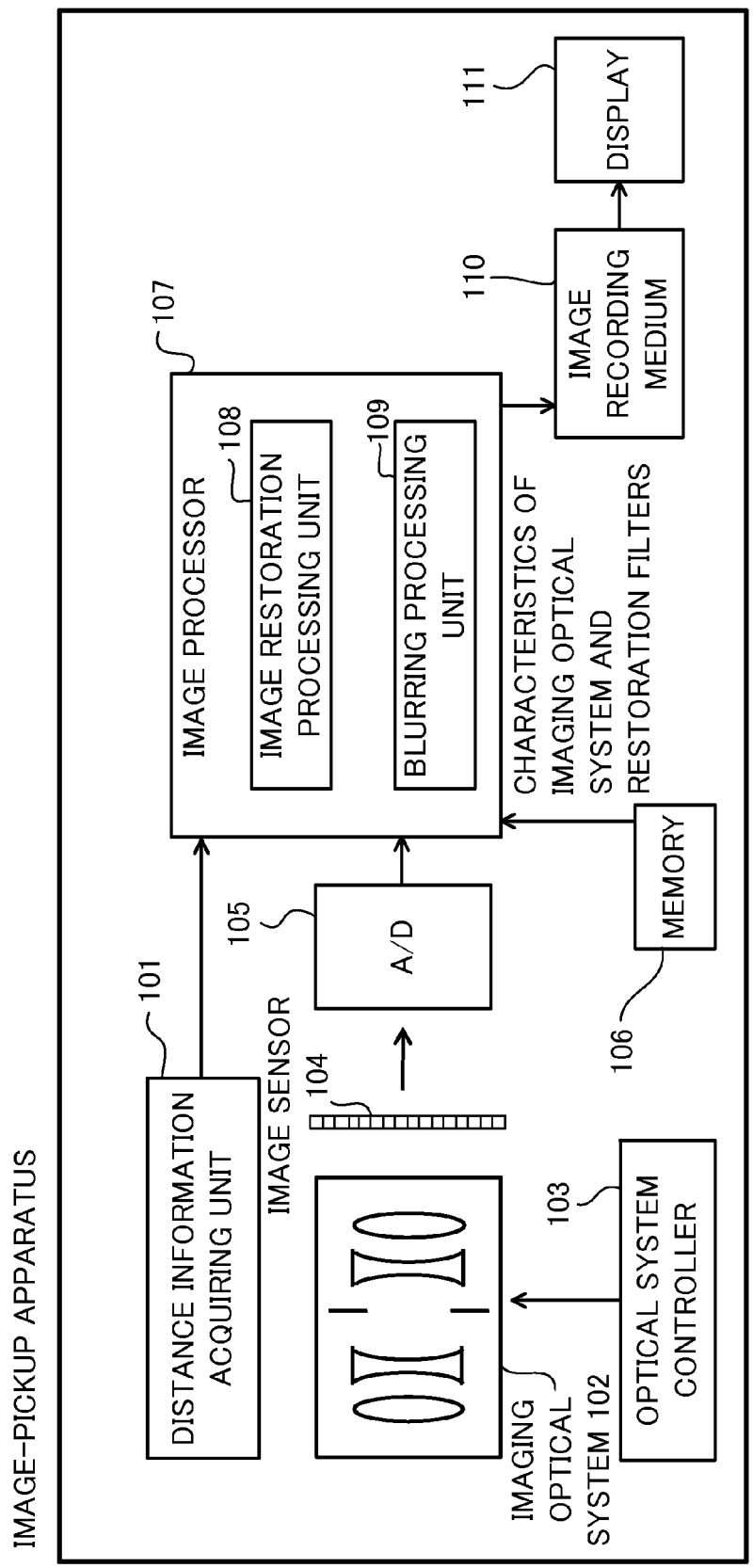
FIG. 1 is a block diagram of a principal part of an image-pickup apparatus according to a first embodiment of the present invention.

FIG. 1 is a block diagram of a principal part of an image-pickup apparatus according to a first embodiment. The image-pickup apparatus may be a compact digital camera, a single-lens reflex camera, a mirror-less camera or a digital video camera.

The image-pickup apparatus includes a distance information acquiring unit 101, an imaging optical system (image-pickup optical system) 102, an optical system controller 103, an image sensor 104, an A/D converter 105, a memory 106, an image processor 107, an image recording medium 110, and a display device 111. A controller (not illustrated) controls each of the above components, and can be implemented as a micro computer.

The distance information acquiring unit 101 acquires distance information between the image-pickup apparatus and each object. A method of acquiring the distance information is not specifically limited. For example, information on a plurality of parallax images may be acquired by a compound eye of a stereo camera or a parallax image where a lens array is arranged at the back of the imaging optical system may be acquired as suggested by Ren Ng et al., supra. A plurality of pieces of distance information for a plurality of objects may be acquired by shifting the in-focus position and by capturing the objects as in the DFF (depth from focus) or the distance information may be acquired at the focal detection point used for the AF as described in JP 2000-259823.

The imaging optical system 102 forms an optical image of an object and is an optical system including lenses (not illustrated) and a diaphragm (not illustrated). The optical system controller 103 controls the diaphragm and the lens position in the imaging optical system 102.

The image sensor 104 performs a photoelectric conversion for an optical image formed by the imaging optical system 102. The image sensor 104 is a two-dimensional image sensor, such as a CCD (Charge Coupled Device) and a CMOS (Complementary Metal-Oxide Semiconductor).

The A/D converter 105 converts an analog signal from the image sensor 104 into a digital signal.

The memory 106 stores a characteristic, such as a diffraction, an aberration, a vignetting, a defocus amount, and an exposure amount, and an image-pickup condition such as an aperture value, a focal length, and exposure of the imaging optical system 102 and information on image restoration filters. These pieces of information may be previously stored or may be input and updated any time by the optical system controller 103 through a communication between the imaging optical system 102 and the optical system controller 103.

Figure 4:
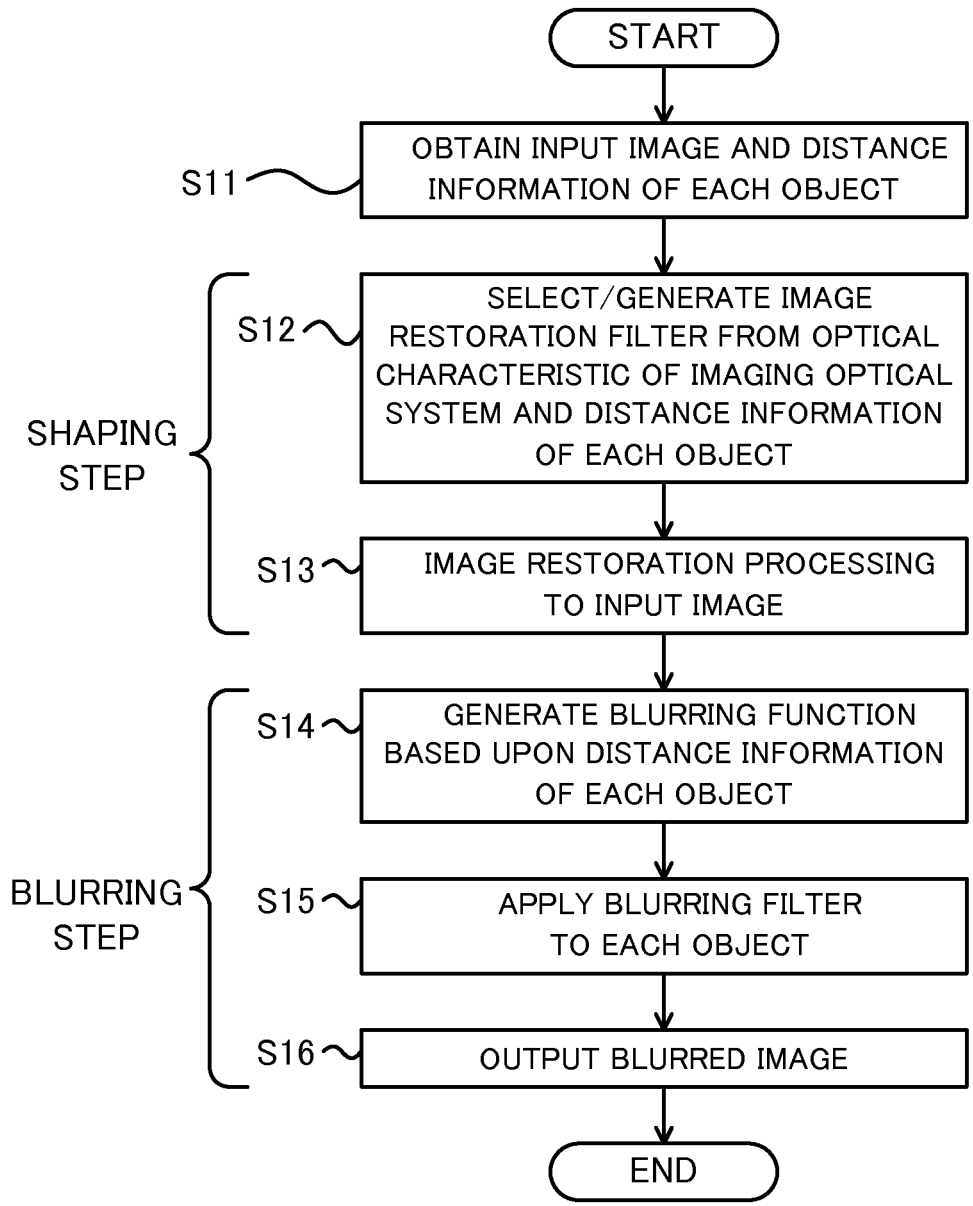
FIG. 4 is a flowchart for explaining an operation of an image processor illustrated in FIG. 1 according to the first embodiment.

The image processor 107 executes an image processing method which will be described later with reference to FIG. 4, and includes an image restoration processing unit 108 and a blurring processing unit 109. The image recording medium 110 records an image processed by the image processor 107, and may include a semiconductor memory. The display device 111 displays the processed image, and may include a liquid crystal display.

Light from the object (not illustrated) forms an image on the image sensor 104 via the imaging optical system 102. An analog electric signal from the image sensor 104 is converted into a digital signal by the A/D converter 105, and input to the image processor 107. The image processor 107 additionally receives the distance information acquired by the distance information acquiring unit 101 and the information on the characteristic of the imaging optical system and the image-pickup condition stored in the memory 106. The image processor 107 performs predetermined processing for the digital signal output from the A/D converter 105 by using the distance information and the information on the characteristic and the image-pickup condition of the imaging optical system, and stores the processed digital signal in the image recording medium 110. The image information stored in the image recording medium 110 is sent to and displayed by the display device 111.

The first embodiment restores an image, prevents a blur from being an asymmetrical shape due to the aberration, the diffraction and the vignetting, and generates a well-shaped blur.

A description will now be given of a principle of the image restoration. The image restoration is processing for reducing a blur caused by the aberration of the optical system utilizing a point spread function (referred to as a "PSF" hereinafter) as a function representing a response of the optical system to a point light source or an optical transfer function (referred to as an "OTF" hereinafter) obtained by Fourier-transforming the PSF. The PSF and OTF are functions based upon the aberration information of the optical system.

The OTF contains frequency component information of the aberration, the diffraction, and the vignetting, and is expressed by a complex number. An absolute value or an amplitude component of the OTF is referred to as an MTF, and its phase component is referred to as a PTF. The MTF and PSF are frequency characteristics of the amplitude component and the phase component of the image deterioration caused by the aberration, the diffraction, and the vignetting.

The phase component is expressed as a phase angle below. Re(OTF) and Im(OTF) are a real part and an imaginary part of the OTF.

$$PTF = \tan^{-1}(Im(OTF)/Re(OTF)) \quad (1)$$

Since the OTF of the imaging optical system 102 deteriorates the amplitude component and the phase component of an image, each point of an object in the deteriorated image is asymmetrically blurred as seen with the coma, for example. The image restoration processing or the restoration processing method is a method for correcting the amplitude deterioration component and the phase deterioration component by using the OTF (or the PSF) information of the imaging optical system 102.

Assume that a deteriorated image is g(x, y), a pre-deterioration image is f(x, y) and a PSF as a Fourier pair of an OTF is h(x, y). Then, the following expression is established where * denotes a convolution (convolution integral) and (x, y) denotes a coordinate on the image.

$$g(x,y) = h(x,y) * f(x,y) \quad (2)$$

When Expression 2 is Fourier-transformed into a display format on a frequency plane, a product format for each frequency is obtained as follows where H is an OTF since H is obtained by Fourier-transforming a PSF(h), and G and F are obtained by Fourier-transforming g and f, respectively. (u, v) denotes a coordinate on a two-dimensional frequency plane or the frequency.

$$G(u,v) = H(u,v) \cdot F(u,v) \quad (3)$$

In order to obtain a pre-deterioration, original image based upon the captured deteriorated image, both sides of Expression 3 may be divided by H as follows:

$$G(u,v)/H(u,v) = F(u,v) \quad (4)$$

By inversely Fourier-transforming F(u, v) or G(u, v)/H(u, v) so as to return it to a real plane, the original image f(x, y) is obtained as a restored image.

Assume that R is an inverse Fourier transform of $H^{-1}$. Then, the pre-deterioration image f(x, y) can be similarly obtained by convoluting the image in the real plane as follows:

$$g(x,y) * R(x,y) = f(x,y) \quad (5)$$

R(x, y) will be referred to as an image restoration filter. In general, when the image is two-dimensional, the image restoration filter is also a two-dimensional filter having a tap (cell) corresponding to each pixel in the image. Since the restoration accuracy generally improves as the tap number (cell number) in the image restoration filter increases, the viable tap number is set according to the demanded image quality, image processing ability, the characteristic of the aberration, etc. Since the image restoration filter depends upon the OTF, the deteriorations in the amplitude component and the phase component can be precisely corrected.

Since an actual image contains a noise component, the noise component is greatly amplified in restoring the deteriorated image if the image restoration filter is made as a full reciprocal of the OTF. This is because the MTF (amplitude component) is raised so as to return the MTF of the optical system over the entire frequency when the amplitude of the noise is added to the amplitude component of the image. Although the MTF as the amplitude deterioration of the optical system is returned to 1, the power spectrum of the noise is also raised and the noise is consequently amplified according to the raised level (restoration gain) of the MTF.

Therefore, a good image for viewing cannot be obtained if the image contains noises. This can be expressed in the following expressions where N denotes a noise component.

$$G(u,v) = H(u,v) \cdot F(u,v) + N(u,v) \quad (6)$$

$$G(u,v)/H(u,v) = F(u,v) + N(u,v)/H(u,v) \quad (7)$$

As in a Wiener filter illustrated in Expression 8, there is known a method for controlling the restoration level according to an intensity ratio (SNR) between the image signal and the noise signal.

$$M(u, v) = \frac{1}{H(u, v)} \frac{|H(u, v)|^2}{|H(u, v)|^2 + SNR^2} \quad (8)$$

Herein, M(u, v) denotes a frequency characteristic of the Wiener filter, and |H(u, v)| denotes an absolute value (MTF) of the OTF. This method restrains the restoration gain as the MTF becomes smaller for each frequency, and raises the restoration gain as the MTF becomes larger. In general, the MTF of the imaging optical system 102 is higher on the low frequency side and lower on the high frequency side. Thus, this method can substantially suppress the restoration gain on the high frequency side in the image.

Figure 2A:
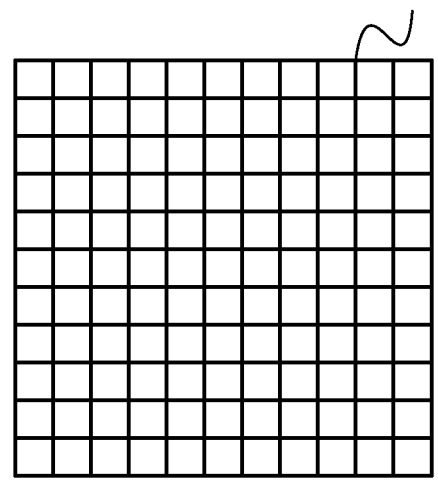
FIGS. 2A and 2B are a schematic view and a sectional view of an image restoration filter stored in a memory illustrated in FIG. 1.

FIG. 2A is a schematic view of an image restoration filter stored in the memory 106. The tap number for the image restoration filter can be determined according to the aberrational characteristic of the imaging optical system 102 or the demanded restoration accuracy. FIG. 2A illustrates a two-dimensional filter with 11×11 taps in an example.

Each tap in the image restoration filter corresponds to each pixel in the image and is used for the convolution process (convolution integral) in the image restoration processing step. The convolution process accords a certain pixel with the center of the image restoration filter so as to improve a signal value of that pixel. Then, the product of the signal value of the image and the coefficient value of the filter is determined for each corresponding pixel of the image and the image restoration filter, and the total sum of the product replaces with the signal value of the center pixel.

Figure 2B:
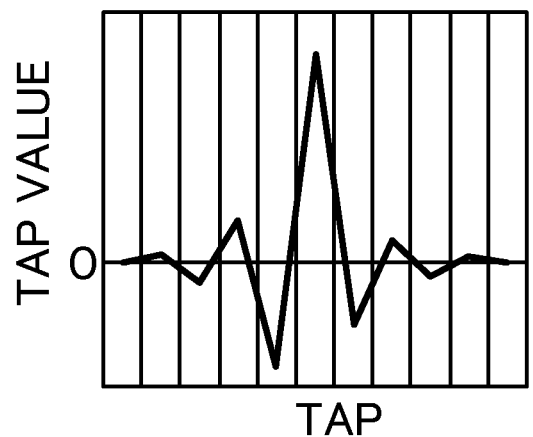

FIG. 2A omits a value (coefficient) in each tap. FIG. 2B illustrates one section of the image restoration filter illustrated in FIG. 2A. In FIG. 2B, an abscissa axis denotes the tap and an ordinate axis denotes the tap value. A distribution of values (coefficient values) of respective taps in the image restoration filter serves to ideally return the signal values spatially dispersed by the aberration to one original point.

The image restoration filter can be obtained by calculating or measuring the OTF of the imaging optical system 102 and by inversely Fourier-transforming a function that is derived from its inverse function. Further, by convoluting the input image with the image restoration filter in the real space, the image can be restored without the Fourier transform or the inverse Fourier transform of the image in the image restoration processing. The input image is a captured image via the image-pickup optical system.

A description will now be given of the image restoration filter according to this embodiment configured to improve the symmetry of the aberration. As understood from Expression 8, an rOTF portion in Expression 9 is a frequency characteristic of a restored image that is made by capturing a point light source.

$$M(u, v) = \frac{1}{H(u, v)}[rOTF] \qquad (9)$$

Herein, rOTF is an arbitrary function. Since the phase deterioration component of the restored image is expected to be 0, rOTF is practically equal to rMTF because rOTC may not contain a phase component and may contain only the real part. Although rOTF is expected to contain only a real part, it may contain an imaginary part within a permissible range. In other words, any object regardless of a point light source may be an image as if it is captured through the imaging optical system 102 in which OTF has a characteristic of rOTF.

Hence, by using Expression 10 in which common OTF (rH(u, v)) is used among (azimuth) directions orthogonal to the principal ray (a ray of light that passes a center of a pupil of the optical system), an image can be obtained as if it is captured through the imaging optical system in which there are no MTF differences among the azimuth directions.

$$M(u, v) = \frac{1}{H(u, v)} \frac{|rH(u, v)|^2}{|rH(u, v)|^2 + SNR^2} \qquad (10)$$

Figure 3A:
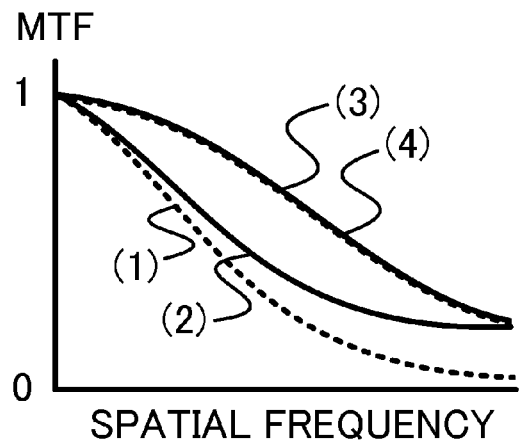
FIGS. 3A to 3C are graphs for explaining the MTF of the image restoration according to a first embodiment.
Figure 3B:
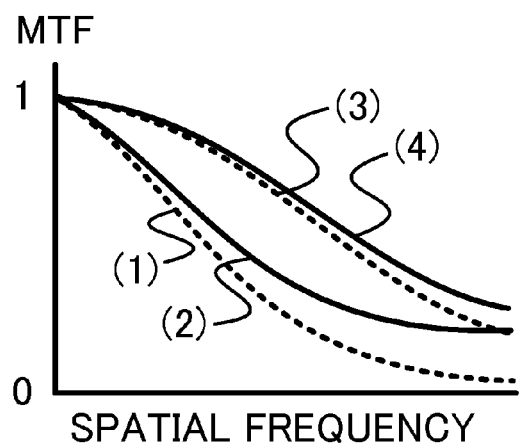
Figure 3C:
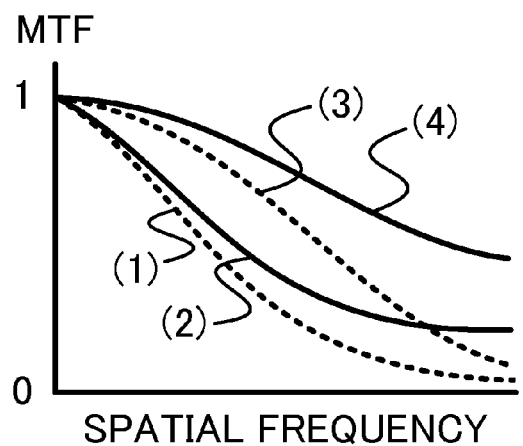

A detailed description will be given of this fact with reference to FIG. 3A. FIGS. 3A to 3C are graphs for explaining the MTF in the image restoration, where an abscissa axis denotes a spatial frequency and an ordinate axis denotes an MTF. Although the pre-restoration MTFs are different among the azimuth directions as illustrated in (1) and (2), the post-restoration MTFs are matched as illustrated in (3) and (4) among the azimuth directions. For example, (1) corresponds to the MTF in the meridional direction, and (2) corresponds to the MTF in the sagittal direction.

The image restoration filter of this embodiment can restore the image while correcting the MTF differences among the azimuth directions. Although the common OTF (rH(u,v)) is used among the azimuth directions in Expression 10, the rotational symmetry can be controlled by correcting rH(u, V) so that the OTF difference for each azimuth direction can be lower than the pre-restoration OTF difference.

FIG. 3B illustrates the MTFs of the image restoration when a correction does not provide a completely rotational symmetry. FIG. 3C illustrates the MTF of the image correction by the conventional wiener filter. In each of FIGS. 3B and 3C, the abscissa axis denotes the spatial frequency and the ordinate axis denotes the MTF. The curve (1) represents the pre-restoration MTF in the meridional direction, the curve (2) represents the pre-restoration MTF in the sagittal direction, the curve (3) represents the post-restoration MTF in the meridional direction, and the curve (4) represents the post-restoration MTF in the sagittal direction.

According to the first embodiment, even when the post-restoration MTFs do not completely match as in the curves (3) and (4) in FIG. 3B, the MTF difference among the azimuth directions is reduced in comparison with that of the curves (3) and (4) in FIG. 3C and the asymmetry of the PSF is reduced. In order to obtain the correction effect of asymmetry, the control needs to reduce the pre-restoration MTF difference among the azimuth directions. Since the H(u, v) portion in Expression 10 is different among the azimuth directions, the image restoration filter has an asymmetric coefficient array regardless of whether the rH(u, v) is common or different among the azimuth directions. In other words, this means that the sectional view illustrated in FIG. 2B is different among the azimuth directions.

The OTF may contain a factor that causes the OTF to deteriorate in the image-pickup procedure other than the imaging optical system 102. For example, an optical low-pass filter having birefringent suppresses a high frequency component in the frequency characteristic of the OTF. The shape and aperture ratio of the pixel aperture of the image sensor 104, vignetting, the spectral characteristic of the light source, and the spectral characteristics of a variety of wavelength filters affect the frequency characteristic. The image restoration filter may be produced based upon the OTF in a broad sense including these factors. The tap numbers in the horizontal and vertical directions of the image restoration filter may not provide a square array and the tap number may be arbitrarily variable and set in the convolution processing.

Since the image restoration processing can precisely process the inverse process configured to restore the pre-restoration, original image when the deterioration process of the image is linear, the input image may not undergo various adaptive nonlinear processes. A mosaic image (RAW image) may be restored.

However, a demosaic image can be similarly restored when the deterioration process by a color interpolation process is linear and the image restoration filter is produced by considering this deterioration function. The demosaic image may be restored when the requested restoration accuracy is low or when the available image is limited to one that has been processed by various image processes. The image processing method according to this embodiment is applicable whether the input image is a mosaic image and a demosaic image.

A description will be given of the image processing method according to the first embodiment with reference to the flowchart illustrated in FIG. 4. The operation described in the flowchart illustrated in FIG. 4 is performed by the image processor 107 under control of a controller (not illustrated). "S" stands for the step, and the flowchart illustrated in FIG. 4 can be implemented as an image processing program configured to enable a computer (processor) to execute the function of each step.

In other words, the image processing program (software) is realized when the program is supplied to a system or an apparatus via a network or at least one of a variety of types of recording media and when the computer (the CPU, the MPU, or the like) of the system or the apparatus reads and executes the program.

In S11, the image processor 107 obtains an input image from the A/D converter 105 and distance information from the distance information acquiring unit 101.

S12 and S13 constitute the shaping step performed by the image restoration processing unit 108. The shaping step provides shaping so as to reduce the above image deterioration caused by the characteristic of the optical system. This is similarly applied to other embodiments.

Figure 5:
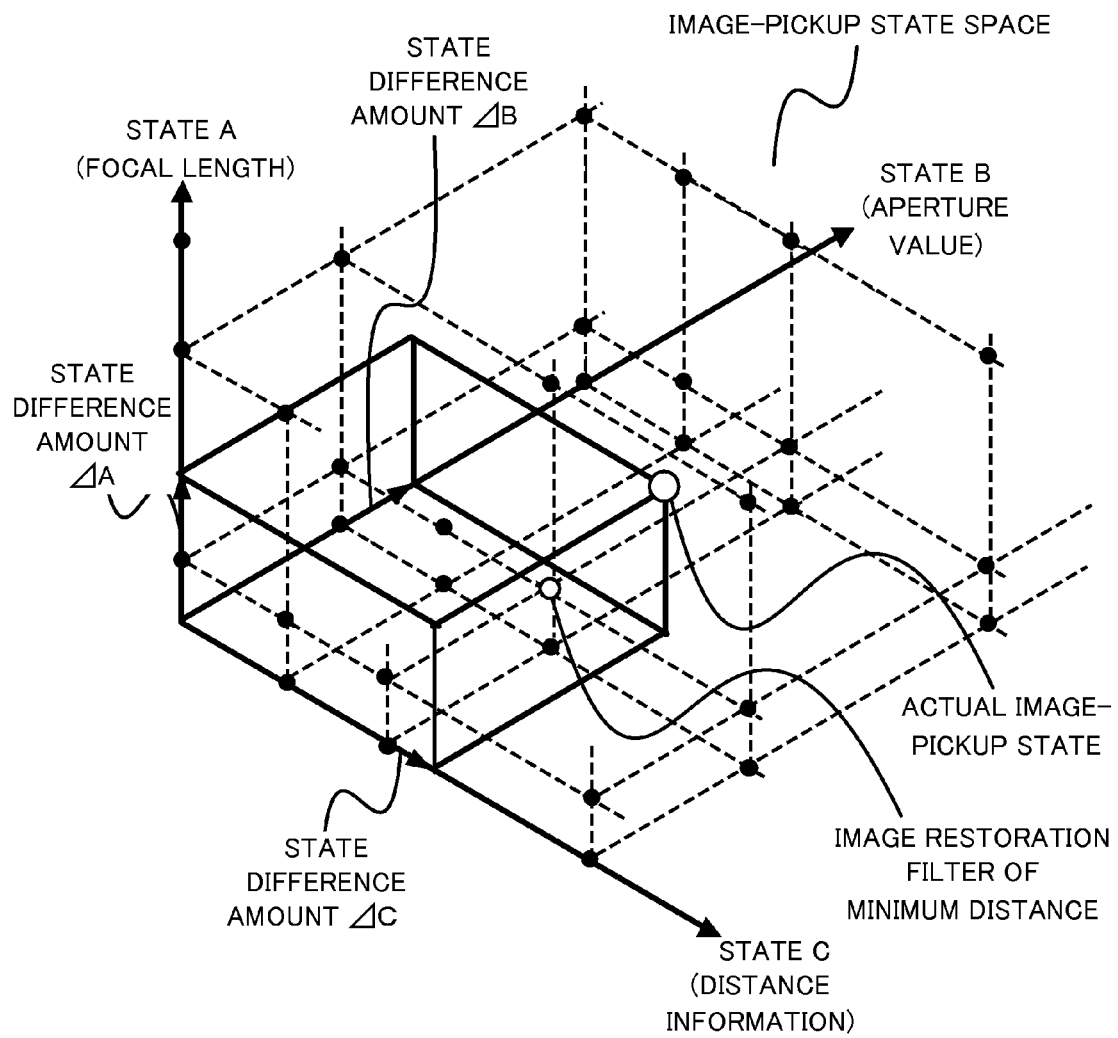
FIG. 5 is a view for explaining S12 illustrated in FIG. 4 according to the first embodiment.

In S12, the image restoration processing unit 108 obtains (selects or generates) the image restoration filter corresponding to the characteristic and the image-pickup condition of the imaging optical system 102, and the distance information of the object. Referring now to FIG. 5, a description will be given of the selection or generation of the image restoration filter.

FIG. 5 illustrates a schematic view of the image restoration filters stored in the memory 106. The image restoration filters are discretely disposed in an image-pickup state space having three axes corresponding to a focal length, an aperture value, and distance information. A coordinate of each (black dot)

point in the image-pickup state space represents a previously stored state position of the image restoration filter.

Although the image restoration filters are disposed at grid points orthogonal to the image pickup states for convenience in FIG. 5, the image restoration filters may be offset from the grid points. Although a three-dimensional view corresponding to the three image-pickup states is used, the number of image-pickup states may be four or more and a four- or higher-dimensional image-pickup state space may be configured.

Assume that a large white dot represents the actual image-pickup state in FIG. 5. In simply selecting the image restoration filter, the image restoration filter closest to the position of the actual image-pickup state is selected and used for the image restoration processing. For example, a distance to each grid point from the position of the actual image-pickup state is calculated and the image restoration filter having the shortest distance is selected. In FIG. 5, the image restoration filter corresponding to the small white dot is selected. Another method may select an image restoration filter using an evaluation function that is a product of a distance and a weight of a direction in the image pickup state space.

In correcting the image restoration filter, initially, the image restoration filter closest to the position of the actual image-pickup state is selected. Thereby, a subsequent correction amount can be made small and the image restoration filter close to the original filter in the image-pickup state can be generated. In FIG. 5, the image restoration filter at the small white dot position is selected.

Next, state difference amounts $\Delta A$, $\Delta B$ and $\Delta C$ between the actual image-pickup state and the state corresponding to the selected image restoration filter are calculated. The "state difference amounts" are difference amounts relating to the state A (focal length), the state B (aperture value) and the state C (distance information). A state correction coefficient is calculated based upon the state difference amounts and the selected image restoration filter is corrected. Thereby, the image restoration filter corresponding to the actual image-pickup state can be generated.

Another method may select a plurality of image restoration filters located near the actual image-pickup state and provide an interpolation process in accordance with the state difference amount. Thereby, an image restoration filter suitable for the image pickup state can be generated. The interpolation process can utilize a linear interpolation, polynomial interpolation, spline interpolation, or the like of coefficient values of corresponding taps of the two-dimensional filter.

In S13, the image restoration processing unit 108 convolves the input image with the image restoration filter, and obtains the original image. As a result, in the phase deterioration component and the amplitude deterioration component of the image, the phase component is corrected with a target value of 0 and the amplitude component is corrected and so as to be equal among azimuth directions.

Figure 6:
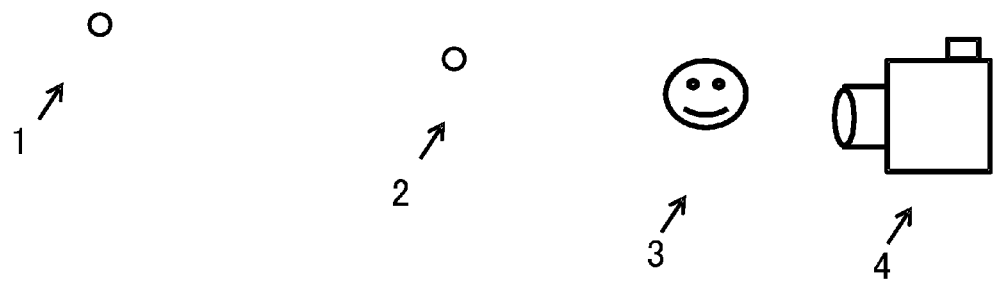
FIG. 6 is a schematic view for explaining an effect of the shaping step illustrated in FIG. 4 according to the first embodiment.

Referring now to FIGS. 6 to 7, a description will be given of an effect of the image restoration according to this embodiment. FIG. 6 illustrates an example of an image-pickup scene and reference numerals 1 to 3 denote objects. Reference numerals 1 and 2 denote subsidiary objects and reference numeral 3 denotes the main object. Reference numeral 4 denotes an image-pickup apparatus.

Figure 7A:
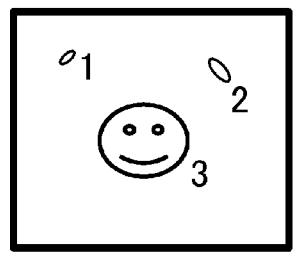
FIGS. 7A to 7E are schematic views for explaining the effect of the shaping step illustrated in FIG. 4 according to the first embodiment.

Assume that FIG. 7A illustrates a pre-restoration input image captured by the image sensor of the image-pickup apparatus. Then, the objects 1 to 3 illustrated in FIG. 7A deform from their original shapes due to the characteristic of the imaging optical system 102.

Figure 7B:
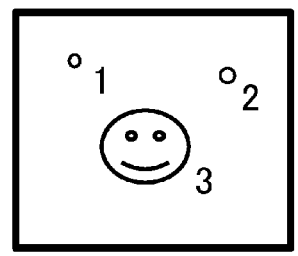
Figure 7C:
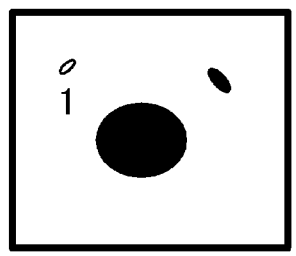
Figure 7D:
Figure 7E:
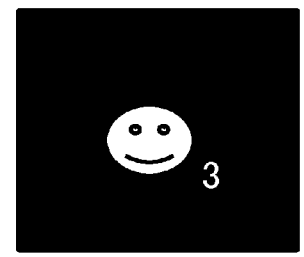

Accordingly, in the dividing step (not illustrated), the objects 1 to 3 are divided in three layers (layered images) as illustrated in FIGS. 7C to 7E on the basis of information of the object distance (distance information) obtained in S11 (dividing step). The layer is an image that contains at least one object when the input image is divided into a plurality of layers. The original image is formed by superimposing all layers. Each layer is prepared for each predetermined range of object distance. Each layer may be prepared for each of the plurality of objects having different object distances (object distance).

Herein, the term "prepare" in this specification means storing data (such as distance information of an object) in a memory or obtaining the data from an external device.

Next, in S12, the image restoration processing unit 108 selects or generates an image restoration filter corresponding to each layer based upon the distance information obtained in S11. The selection or generation of the image restoration filter corresponding to each layer means a selection or generation of the image restoration filter suited to reduce the aberration in the object in each layers based upon the image-pickup condition, more specifically, the distance information, as described with reference to FIG. 5.

Next, in S13, the image restoration processing unit 108 convolutes each layer (layered image) with the image restoration filter, restores the image for each layer, and moves to the blurring step. Alternatively, the processing may move to the blurring step after the image in each layer is restored and the layers are combined so as to generate the image illustrated in FIG. 7B. In combining an image, the pixel values of a plurality of layers may be summed up or one or more of pixel values may be obtained.

S14 to S16 constitute the blurring step performed by the blurring processing unit 109.

Figures 8A, 8B, 8C:
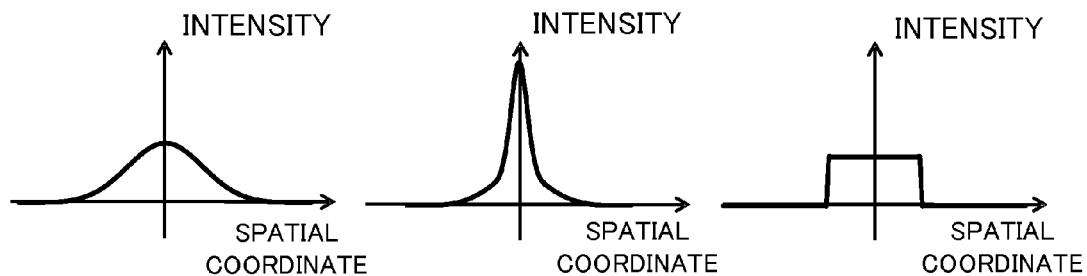
FIGS. 8A to 8C are graphs illustrating examples of a blurring function used in the blurring step illustrated in FIG. 4 according to the first embodiment.

In S14, the blurring processing unit 109 applies a blur according to the distance information to the restored image. In this embodiment, three blurring functions are provided as illustrated in FIGS. 8A-8C, and the value depending upon the blurring function is added to the pixel value. In each graph in FIGS. 8A-8C, the abscissa axis denotes the spatial coordinate and the ordinate axis denotes the intensity. FIG. 8A illustrates a Gaussian blurring function in which the blur smoothly attenuates towards the periphery. FIG. 8B is a blurring function made by combining two types of Gaussian curves having different half-value breadths in which the blur has a high intensity near the center. FIG. 8C is a blurring function having a rectangle shape which provides a uniform blur. Of course, the blurring function is not limited to these functions, and an arbitrary blurring function may be used.

The blurring processing unit 109 obtains the blurring functions to be added to the objects 1 and 2 illustrated in FIG. 7B. The blurring processing unit 109 may obtain the blurring functions specified by the user or may use the blurring function defined in the image-pickup apparatus.

The value based on the obtained blurring function are used for the value of each pixel of the two-dimensional filter of FIG. 2A in S15. The blurring function does not have to be a function based on the distance information, and may be freely varied such as using the same blurring function for different object distances. The two-dimensional filter having a value of the blurring function will be referred to as a blurring filter hereinafter.

Figure 9A:
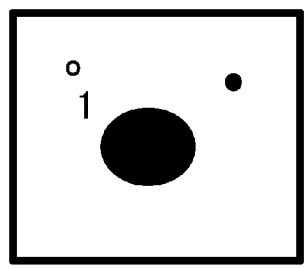
FIGS. 9A to 9D are schematic views of the images illustrated in FIGS. 7A-7E which has undergone S13 in FIG. 4 according to the first embodiment.
Figure 9B:
Figure 9C:
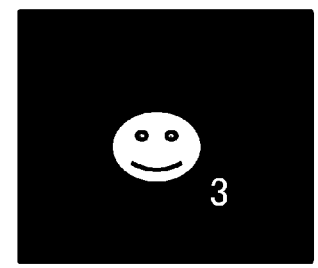
Figure 9D:
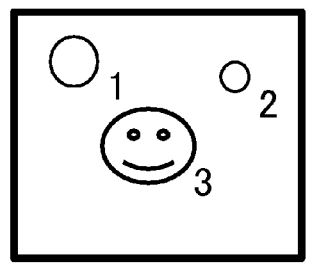

In S15, the blurring processing unit 109 convolutes the blurring filter with each layer. The layers 1 to 3 (FIGS. 9A to 9C) restored in S13 are convoluted with the blurring filter obtained in S14, and the blurred layers 1 to 3 are obtained. Then, the images of the blurred layers 1 to 3 are combined. In combining the layers 1 to 3, the pixel values of the plurality of layers may be summed up or one or more pixel values may be obtained. FIG. 9D illustrates the combined image.

The blurring method illustrated in S14 and S15 is merely illustrative. Instead of dividing the image into layers, the image illustrated in FIG. 7B may be cut (divided) into a plurality of areas based upon the object distance, each cut area is convoluted with the blurring filter, and a satisfactorily image may be obtained. In other words, different blurring filters may be convoluted in one image. Further, the size of blur may be defined as a range where a half-value breadth or a brightness value of the blurring function is 0 or higher, and a blur may be added by averaging the pixel value of each layer in the blurring area.

In S16, the blurring processing unit 109 outputs the blurred image obtained in S15.

Although the blurring step follows the shaping step according to the first embodiment, these two steps may be simultaneously performed. In that case, the rOTF portion in Expression 9 is set to the frequency characteristic of the blurring function. Then, the input value is convoluted with a filter having a value obtained by inversely Fourier-transforming rOTF/H(u, v) on the right side of Expression 9.

The image-pickup apparatus of the first embodiment can well blur an image by reducing the image deformation caused by the optical characteristic of the imaging optical system 102.

Second Embodiment

Figure 10:
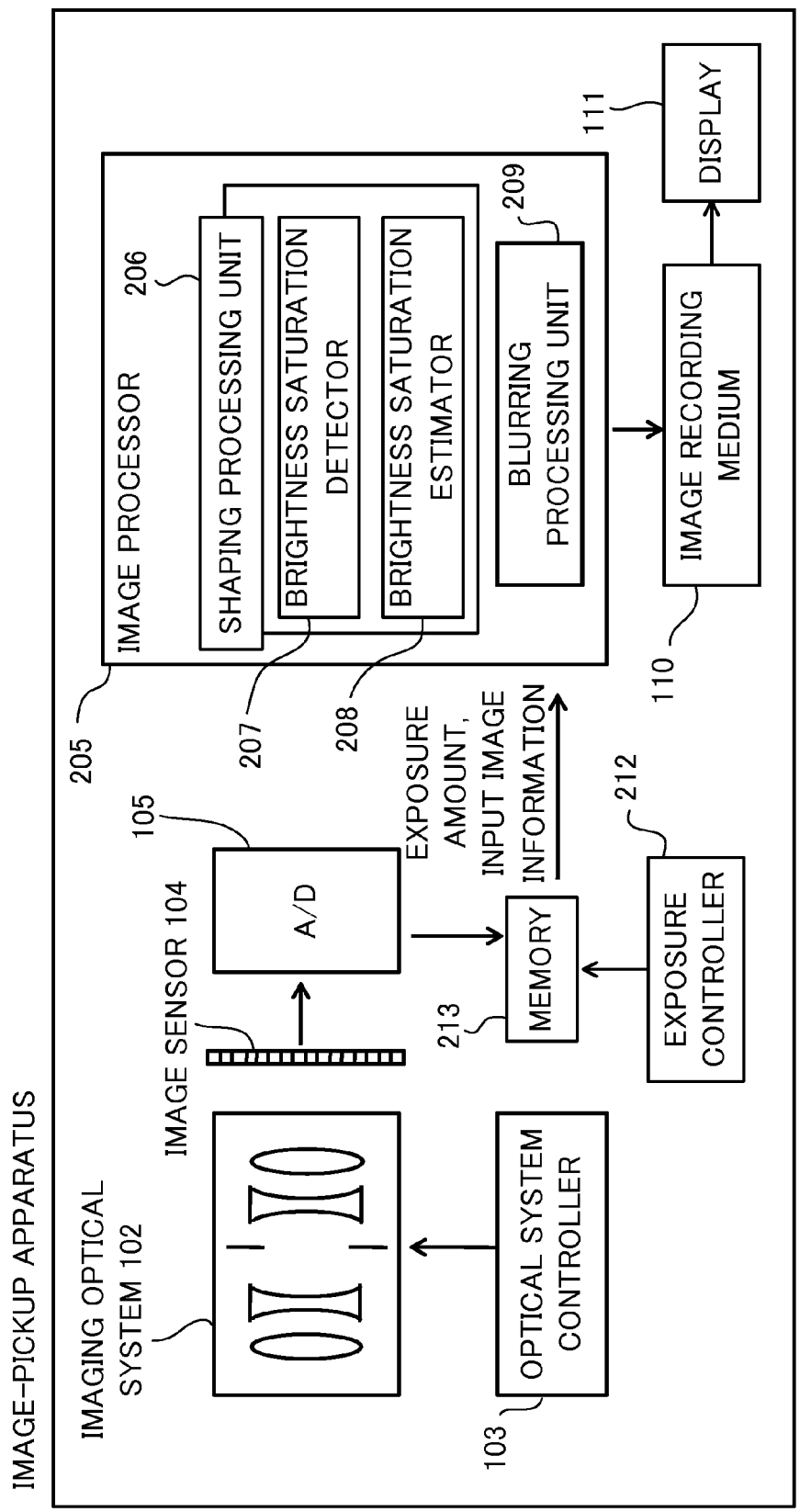
FIG. 10 is a block diagram of a principal part of an image-pickup apparatus according to a second embodiment of the present invention.

FIG. 10 is a block diagram of a principal part of an image-pickup apparatus according to a second embodiment. The image-pickup apparatus according to this embodiment does not include the distance information acquiring unit 101, but includes an image processor 205 instead of the image processor 107 and a memory 213 instead of the memory 106. The image-pickup apparatus of this embodiment further includes an exposure controller 212. This embodiment defines an exposure amount as a light amount which the image sensor 104 receives. In this embodiment, "images having different exposure amounts" mean images captured with a different condition of at least one of the shutter speed, F value, and the ISO sensitivity.

The exposure controller 212 controls the exposure amount. The memory 213 stores information on images obtained by capturing the same object a plurality of times with different exposure amounts and information on the exposure amounts corresponding to the plurality of captured images. One of the plurality of captured images is set to a reference image used to estimate the brightness. The information stored in the memory 213 is sent to the image processor 205.

The image processor 205 includes the shaping processing unit 206 and the blurring processing unit 209. The shaping processing unit 206 includes the brightness saturation detector 207 and the brightness saturation estimator 208. The brightness saturation detector 207 detects a brightness saturation part by using the reference image and the image-pickup condition when picking up the reference image. The brightness saturation estimator 208 estimates the brightness value in the brightness saturation part and sends the estimated brightness value to the blurring processing unit 209. A detailed description of the brightness saturation detector 207 and the brightness saturation estimator 208 will be given later.

Figure 11:
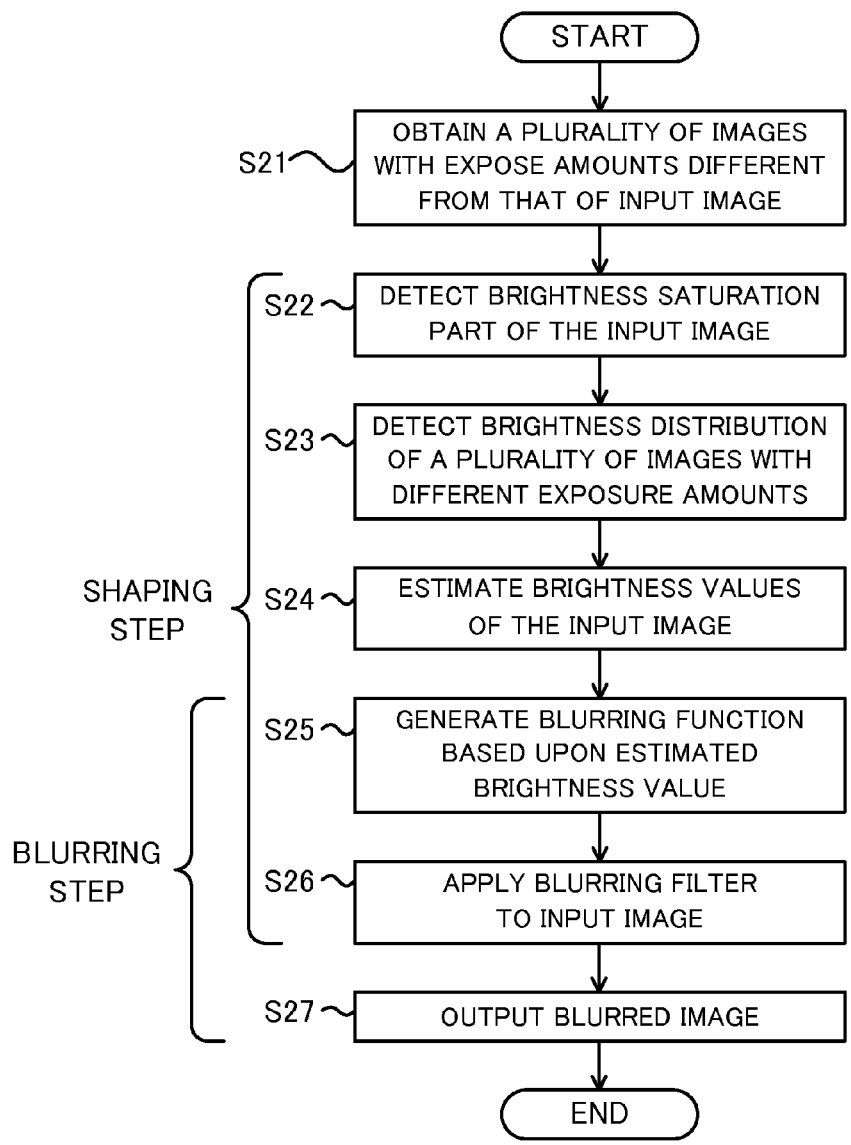
FIG. 11 is a flowchart for explaining an operation of an image processor illustrated in FIG. 10 according to the second embodiment.

A description will be given of image processing executed in the image-pickup apparatus according to the second embodiment will be given with reference to a flowchart illustrated in FIG. 11. The operation of the flowchart illustrated in FIG. 11 is performed by the image processor 205 under control of a control unit (not illustrated). "S" stands for the step, and the flowchart illustrated in FIG. 11 can be realized as an image processing program configured to enable a computer (processor) to realize the function of each step.

This flowchart starts from a state where the same object has been already captured with different exposure amounts by the image-pickup apparatus and the plurality of images having different exposure amounts are stored in the memory 213.

In S21, the image processor 205 obtains, from the memory 213, a reference image and a plurality of images having different exposure amounts which are obtained by capturing the same object as that of the reference image.

Figure 12:
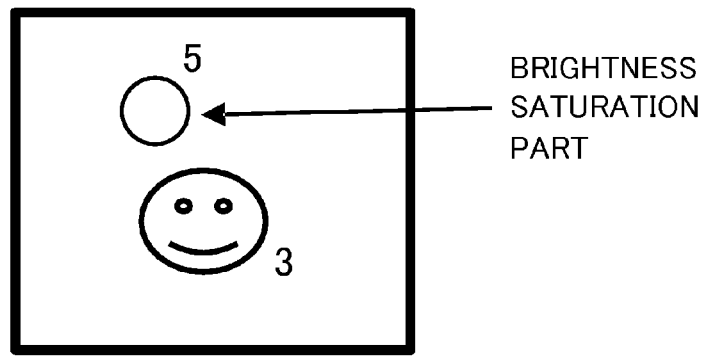
FIG. 12 is a drawing showing an example of a picked up scene including a brightness saturation part according to the second embodiment.

In S22, the brightness saturation detector 207 detects a brightness saturation part in the reference image. FIG. 12 illustrates an example of the reference image which includes a brightness saturation part. Reference numeral 5 denotes the brightness saturation part. The brightness saturation detector 207 obtains a value of each pixel as a brightness values and detects, as a brightness saturation part, a part where the brightness value is a saturated value.

In S23, the shaping processing unit 206 detects a brightness value of the same pixel or at the same image height as that of the brightness saturation part in the reference image obtained in S22 in the plurality of images with different exposure amounts from that of the reference image. Then, among the plurality of images with different exposure amounts, an image having brightness values of all pixels equal to or smaller than the saturation value in the area corresponding to the brightness saturation part of the reference image (the same area) is obtained. Herein, the image having brightness values of all pixels equal to or smaller than the saturation value in the brightness saturation part will be referred to as an image W. While this embodiment obtains, as the image W, the image having brightness values of all pixels equal to or smaller than the saturation value in the brightness saturation part, the image W is not limited to this image. An image having brightness values of 80% of the pixels equal to or smaller than the saturation value in the brightness saturation part may be obtained as the image W.

Figures 13A, 13B:
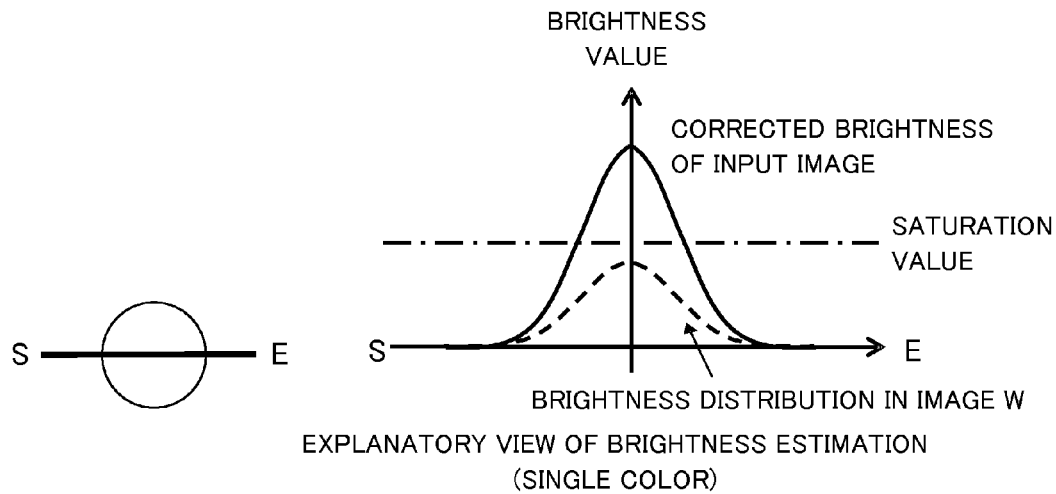
FIGS. 13A and 13B are views for explaining a brightness estimation method used for S24 illustrated in FIG. 11 according to the second embodiment.

In S24, the brightness saturation estimator 208 estimates appropriate brightness values of the reference image if there is no brightness saturation in the reference image that actually contains the brightness saturation part. FIGS. 13A and 13B are views for explaining the brightness estimation method. FIG. 13B illustrates brightness values in one section of FIG. 13A where brightness is saturated, where the abscissa axis denotes a spatial coordinate and the ordinate axis denotes a brightness value. Expression 11 is used to estimate the brightness value of the reference image in which the brightness is saturated, based upon the image W (the image in which brightness is not saturated) obtained in S22.

{(EXPOSURE AMOUNT OF REFERENCE IMAGE)/(EXPOSURE AMOUNT OF IMAGE $W$)}×(BRIGHTNESS DISTRIBUTION OF IMAGE $W$)=ESTIMATED BRIGHTNESS DISTRIBUTION OF INPUT IMAGE     (11)

This embodiment estimates the brightness distribution near the brightness saturation part in the reference image having the saturation value or higher as illustrated in FIG. 13B by multiplying the brightness distribution in the image W by the ratio between the exposure amount of the reference image and the exposure amount of the image W. In other words, in S22, the brightness saturation estimator 208 estimates the brightness value in the brightness saturation part in the reference image by using the exposure amount of the reference image (the first image), the exposure amount of the image W (the second image), and the brightness value in the area in the image W which corresponds to the brightness saturation part of the reference image.

In S25, the blurring function is selected or generated based upon the brightness value estimated by the blurring processing unit 209. For example, selecting of generating the Gaussian blurring function is based upon the estimated brightness values if the estimated distribution of the brightness value is close to the Gaussian shape illustrated in FIG. 8A.

In S26, the blurring processing unit 209 performs an operation based on the blurring filter having the blurring function information for the reference image. An operation based on the blurring filter, the reference image may be convoluted with the blurring filter as described in the first embodiment. Alternatively, the size of the blurring filter (tap number) may be defined as the blurring size, brightness values of all pixels in that blurring area may be averaged, and the pixel value in the area may be set to the averaged brightness value.

Above S22 to S26 constitute the shaping step performed by the shaping processor 206.

In S27, the blurred image is output.

While the shaping step is executed after the blurring step, the two steps may be simultaneously executed similar to the first embodiment.

Figure 18A:
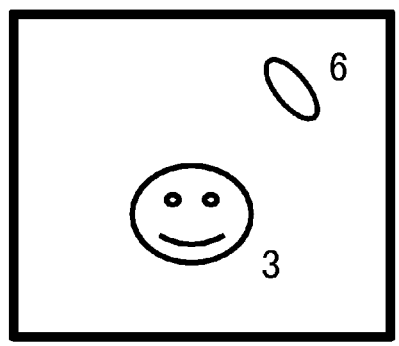
FIGS. 18A and 18B are views for explaining an effect of S44 illustrated in FIG. 17 according to the fourth embodiment.

The brightness estimation according to the second embodiment may be used for the image restoration according to the first embodiment. Differently from the original brightness distribution, the brightness value in the brightness saturation part illustrated in FIG. 18A has a constant saturation value. In that state, an image cannot be accurately restored. Accordingly, the original brightness value is obtained in the brightness saturation part using the brightness estimation process according to the second embodiment, and the image is restored. Thereby, the image can be accurately restored.

The image-pickup apparatus according to the second embodiment can satisfactorily add a blur to an image that contains a brightness saturated part.

Third Embodiment

Figure 14:
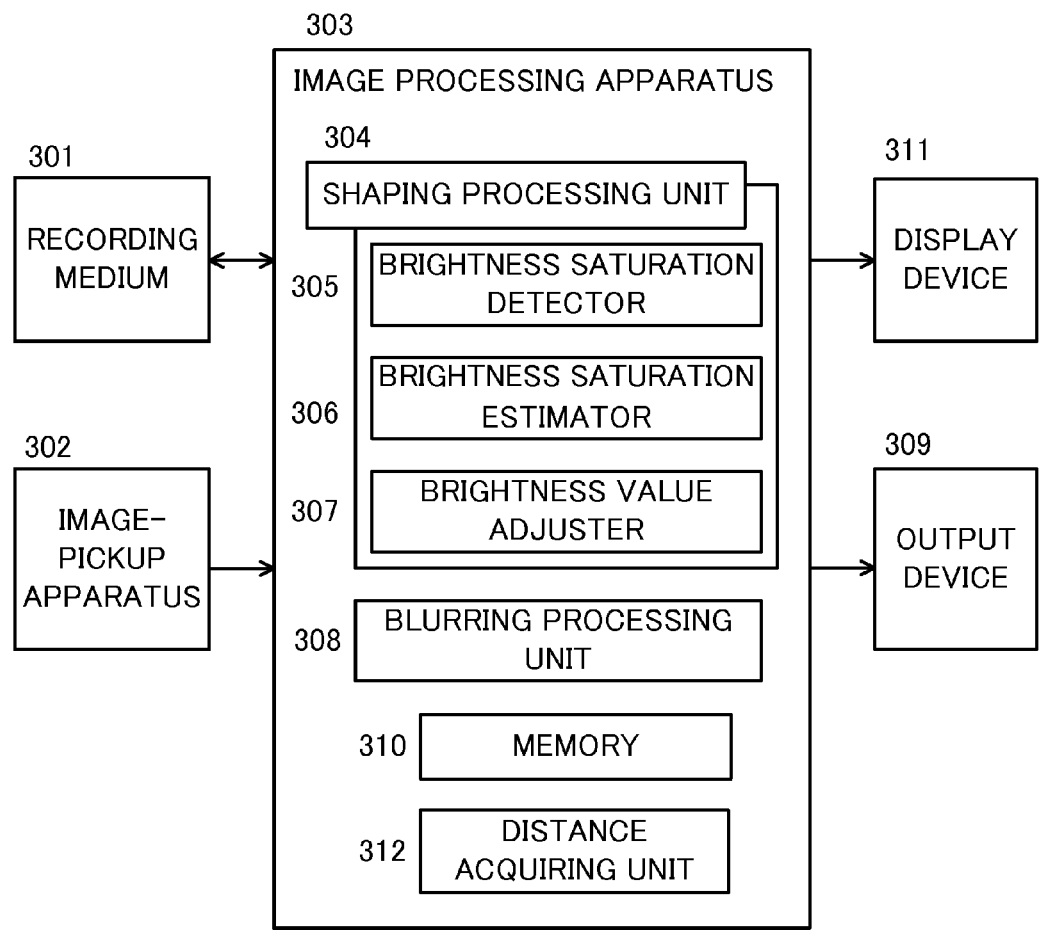
FIG. 14 is a block diagram of a principal part of an image processing system according to a third embodiment of the present invention.

FIG. 14 is a block diagram of an image processing system according to a third embodiment. The image processing system includes a recording medium 301, an image-pickup apparatus 302, an image processing apparatus 303, a display device 311, and an output device 309.

The recording medium 301 may be a semiconductor memory, a hard disk, or a server on a network, for example.

The image-pickup apparatus 302 includes the imaging optical system and the image sensor, and also includes the distance information acquiring unit 101 illustrated in FIG. 1.

The image processing apparatus 303 is a computer configured to perform the shaping processing and the blurring processing, and includes a controller (not illustrated). The image processing apparatus 303 may be composed of a server connected with the image-pickup apparatus 302 via the Internet (cloud computing). Of course, the image processing apparatus 303 may be connected via a network to another personal computer ("PC"), a cellular phone, and a dedicated terminal such as a PDA and a game machine configured to store image information.

The image information processed by the image processing apparatus 303 is output to one or more of the recording medium 301, the display device 311, and the output device 309. The output device 309 is, for example, a printer. The display device 311 is, for example, a liquid crystal display or a projector. The display device 311 is connected to the image processing apparatus 303, and an image is input to the display device 311. A user can provides an operation while confirming the image on the display device 311.

The image processing apparatus 303 includes a shaping processing unit 304, a blurring processing unit 308, a memory 310, and a distance acquiring unit 312. The shaping processing unit 304 includes a brightness saturation detector 305, a brightness saturation estimator 306, and a brightness value adjuster 307.

The brightness saturation detector 305 detects a brightness saturation part. The brightness saturation estimator 306 estimates the brightness value in the brightness saturation part. The brightness value adjuster 307 and blurring processing unit 308 provide predetermined processes based upon the estimated brightness value. The memory 310 stores the characteristic of the imaging optical system in the image-pickup apparatus 302, the input image, and the image-pickup condition. The distance acquiring unit 312 calculates and acquires the distance of each object based upon the plurality of parallax images obtained by the image-pickup apparatus 302.

Figure 15:
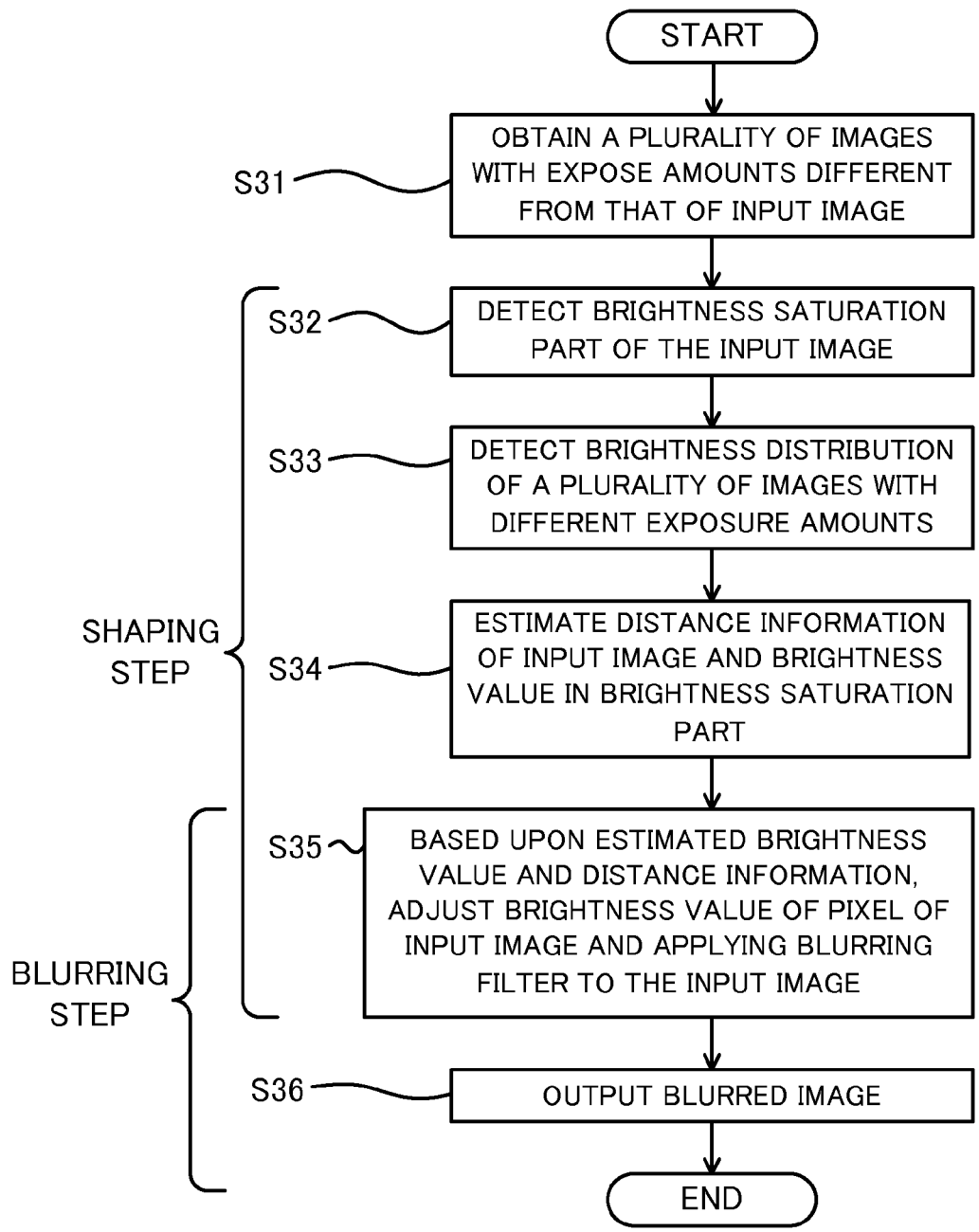
FIG. 15 is a flowchart for explaining an operation of the image processing apparatus illustrated in FIG. 14 according to the third embodiment.

A description will be given of an image processing method according to a third embodiment with reference to a flowchart illustrated in FIG. 15. The image processing apparatus 303 executes an operation of the flowchart illustrated in FIG. 15. "S" stands for the step, and the flowchart illustrated in FIG. 15 can be implemented as an image processing program configured to enable a computer (processor) to serve the function of each step.

The third embodiment reproduces a blur of the brightness saturation part in the image captured with a small F value (or a shallow depth of field) in the image-pickup condition, estimates the brightness, and adjusts the brightness value. The shaping step according to the third embodiment estimates the brightness and adjusts the brightness value.

S31 to S33 are similar to S21 to S23 in the second embodiment, and a description thereof will be omitted.

S34 estimates the brightness value of the brightness saturation part and the distance information. The brightness value of the brightness saturation part is similarly estimated to the second embodiment. In estimating the image-pickup apparatus 302 obtains parallax images and the computer calculates and acquires the distance information.

The distance information may be used to estimate the brightness value in the brightness saturation part. For example, assume that light sources A and B of same type are located with different distances and a scene containing these light sources is captured. In the captured image, it is also assumed that the brightness of the light source A closer to the image-pickup apparatus is saturated and the brightness of the light source B is not saturated farther from the image-pickup apparatus. The farther the object (light source B) from the image-pickup apparatus is, the greater the attenuation of the amount of light entering the imaging optical system 102. Hence, the brightness distribution of the image of the closer light source A in which the brightness is saturated is estimated based upon the relationship between the distance information of the light source A and the light source B and the blurring size described in the first embodiment. This method is effective when the brightness is saturated in the object in all images captured with different exposure amounts.

S35 adjusts the brightness value based on the estimated brightness values in the brightness saturation part and the distance information of the object in which the brightness is saturated obtained in S34, by multiplying the estimated brightness value calculated from the input image by a constant number and by reducing the brightness value as the distance from the image-pickup side increases (adjustment step). Further, S35 selects or generates the blurring filter used for blurring, and adds the blurring value based upon the blurring filter (blurring step). The blurring filter is selected or generated similarly to the first embodiment. The order of the adjustment of brightness value and the blurring processing based on the blurring filter is not limited.

When the blurring value is added after the brightness value is adjusted, the brightness saturation part in the input image is initially estimated, and then the adjusted brightness value is convoluted with the blurring filter. After the convolution process, the value greater than the saturation value is reflected in the brightness value as the saturation values.

When the brightness value is adjusted after the blur is added, the input image is convoluted with the blurring filter, and the brightness of the convoluted image is proportionally multiplied by a ratio of the brightness value in the area in which brightness is saturated to the estimated brightness values before the blur is added.

Blurring after the brightness value is adjusted is effective in reproducing the blur of the brightness saturation part, because this order can provide a more natural blur than the method of adjusting the brightness value after a blur is applied.

In S36, the blurred image is output.

The image processing apparatus according to the third embodiment can satisfactorily add a blur to an image that contains the brightness saturated part.

Fourth Embodiment

Figure 16:
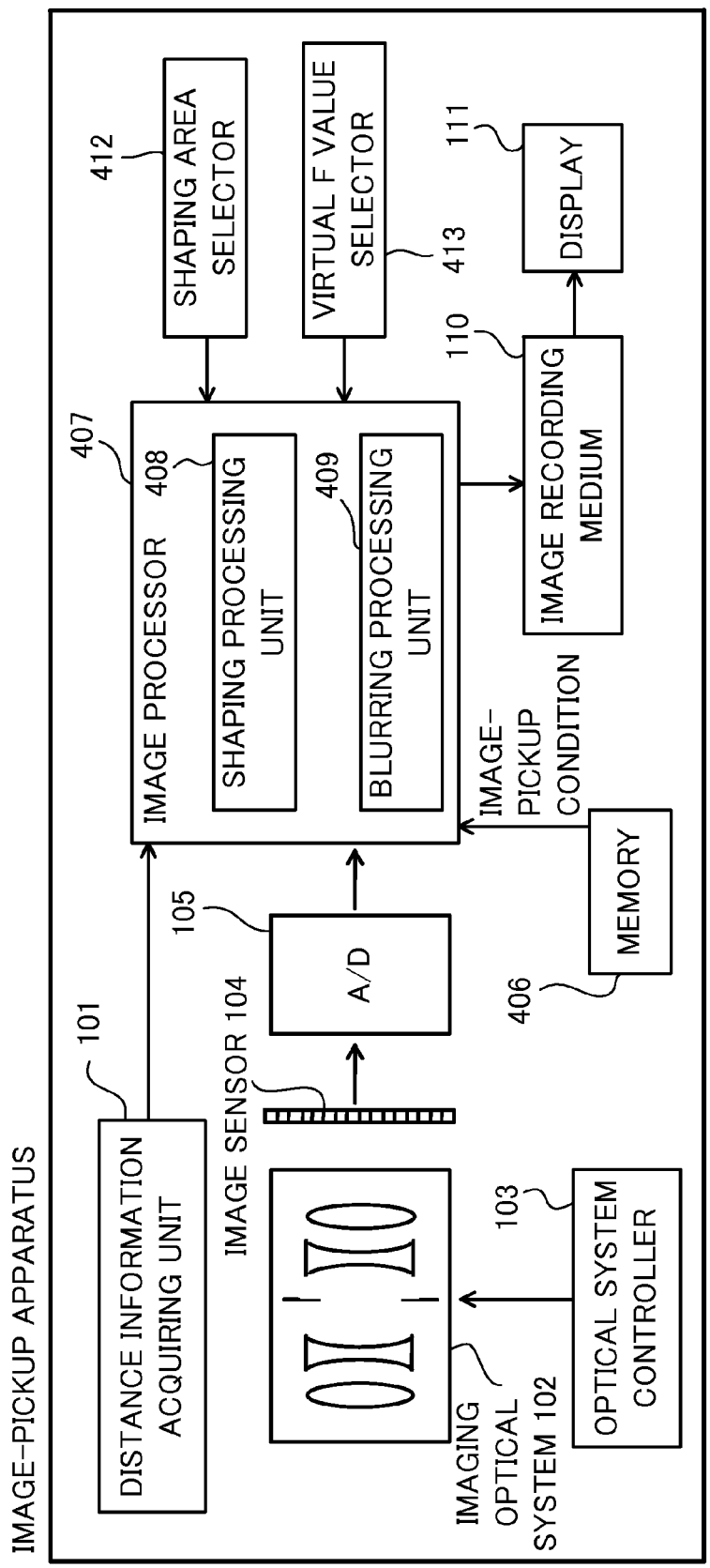
FIG. 16 is a block diagram of a principal part of an image-pickup apparatus according to a fourth embodiment of the present invention.

FIG. 16 is a block diagram of a principal part of an image-pickup apparatus according to a fourth embodiment. The image-pickup apparatus of this embodiment includes a memory 406 (instead of the memory 106), an image processor 407 (instead of the image processor 107), a shaping area selector 412, and a virtual F value selector 413.

The image-pickup condition is stored in the memory 406.

The shaping area selector 412 selects the area in the captured image which will undergo the shaping step described in the first to third embodiments.

The virtual F value selector 413 selects an arbitrary F value (virtual F value) necessary for the shaped area equal to or smaller than the F value of the image-pickup condition used to capture the image. The shaping area selector 412 selects the virtual F value based upon the selection instructed by the user, for example, via an operational button or a touch panel.

The information input to the image processor 407 contains the distance information of each object obtained by the distance information acquiring unit 101, the image-pickup condition obtained by the memory 406, the shaping area obtained by the shaping area selector 412, and the virtual F value information selected by the virtual F value selector 413.

Figure 17:
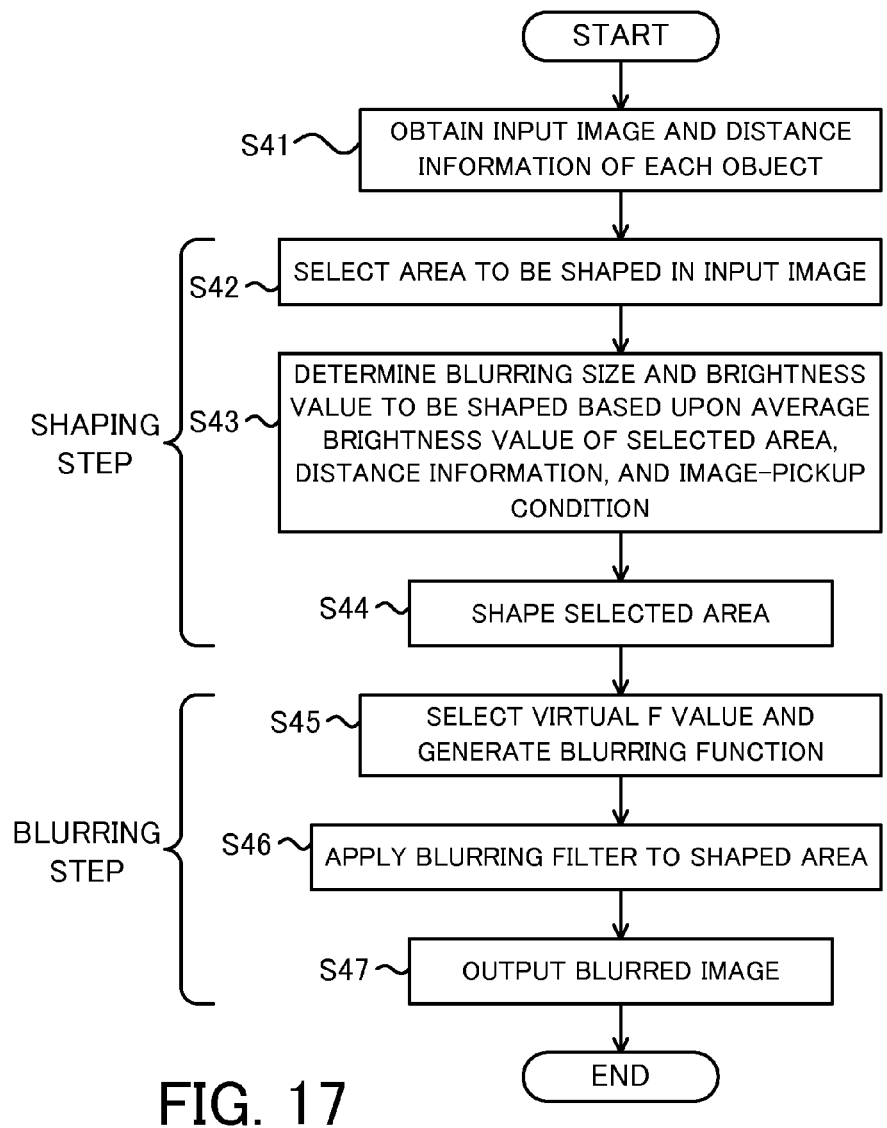
FIG. 17 is a flowchart for explaining an operation of the image processor illustrated in FIG. 10 according to the fourth embodiment.

A description will now be given of image processing performed by the image-pickup apparatus according to the fourth embodiment with reference to the flowchart illustrated in FIG. 17. The image processor 407 executes an operation of the flowchart illustrated in FIG. 17. "S" stands for the step, and the flowchart illustrated in FIG. 17 can be implemented as an image processing program configured to enable a computer (processor) to serve the function of each step.

An image in a significantly blurred area in the periphery of the input image has an asymmetrical shape in which a part is missing due to the vignetting. However, since the MTF becomes almost 0 in the area apart from the in-focus position, it is difficult to correct the asymmetrical blur into a symmetrical blurring by using the image restoration. In other words, it is difficult to restore an image and add a blur as in the first embodiment so as to obtain a good blur. Accordingly, the fourth embodiment shapes the asymmetrical blur in which a part is missing into a good blur in the area apart from the in-focus position.

S41 is similar to S11 in the first embodiment.

S42 to S44 constitute the shaping step performed by the shaping processor 408.

S42 selects the area to be shaped in the input image. In the example of the input image illustrated in FIG. 18A, reference numeral 6 denotes the object lacking part of and deformed from its original shape, and S42 selects an area that contains the object 6 as an area to be shaped. In the shaping area selecting method, the area may be selected by the user or the area may be detected by the image processor 407 according to the brightness value or the like. Alternatively, a conventional edge detection process or the like may make an area having a boundary at the edge of the object 6 selectable or a rectangle area containing the object 6 selectable.

S43 determines the size and brightness value of the object to be shaped based upon the average brightness value of the selected area and the object distance information to the object 6 contained in the area. Based upon the distance information of the area selected in S42 and the F value in the image-pickup condition (the F value for capturing), the size of the shaped blur is calculated in the selected area. Then, the brightness value of the shaped blur is calculated based upon the averaged brightness value in the selected area. A distribution of the blurs to be shaped is, for example, a circularly symmetrical, uniform distribution and each brightness value is treated as the average brightness value.

Figure 18B:
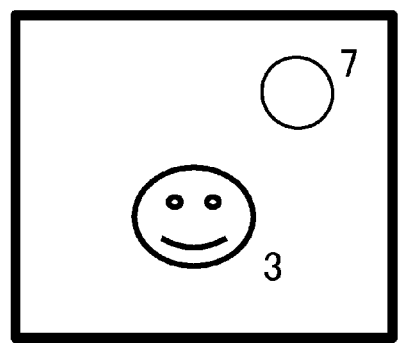
Figure 19A:
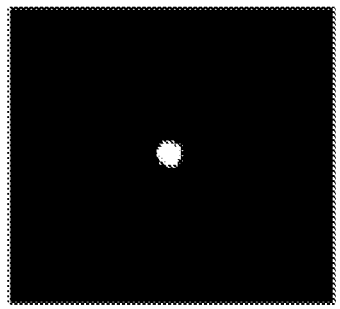
FIGS. 19A to 19D are views for explaining a relationship between an image deformation due to an optical characteristic of the imaging optical system and blurring.
Figure 19C:
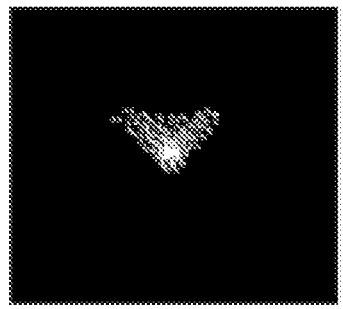
Figure 19B:
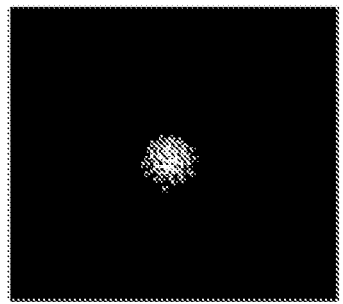
Figure 19D:
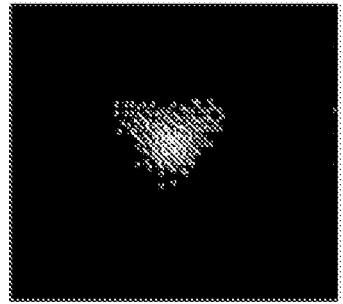
Figure 20A:
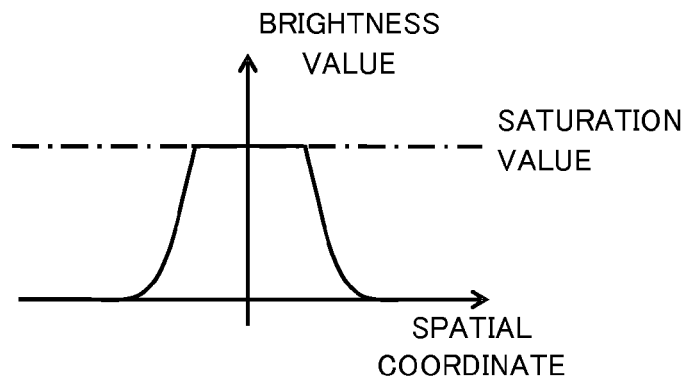
FIGS. 20A to 20C are graphs for explaining brightness saturation.
Figure 20B:
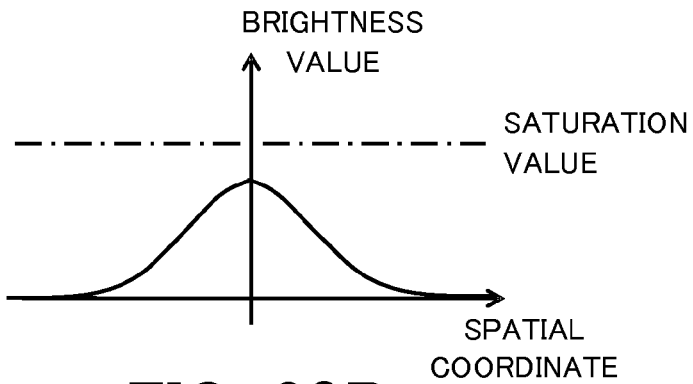
Figure 20C:
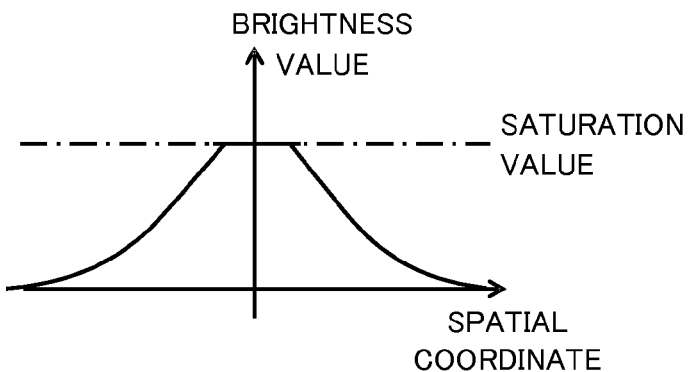

S44 shapes the selected area. More specifically, the brightness value of the input image is replaced with the brightness value in the shaped area obtained in S43 so as to contain the area selected in S42 (replacement step). All brightness values may be replaced or brightness values only in the area to be shaped may be replaced and the other brightness values may be superimposed. By replacing the brightness values, the asymmetrical object illustrated in FIG. 18A can be changed into a circularly symmetrical object illustrated in FIG. 18B.

S45 to S47 constitute the blurring step performed by the blurring processing unit 409.

In S45, the blurring processing unit 409 selects or generates a blurring function based upon the virtual F value selected in S44. The blurring function is selected or generated similarly to S14 in the first embodiment. The blurring size is determined based on the virtual F value and the blurring filter having the tap number suited for the size of the blurring is selected or generated. The depth of field is shallow when the virtual F value is small. Thus, the blurring size is determined based upon the virtual F value in such a manner that a larger blurring size is set when the virtual F value is small than when the virtual F value is large. Then, by setting the center position of the area selected in S44 as the center, the blurring calculated in S43 is applied. Although the size of the blurring is decided based on the virtual F value in this embodiment, the virtual F value may be decided arbitrarily.

S46 adds the blur based on the blurring filter selected or generated in S45 to the shaped area. The blurring method can be executed in a similar way as S15 in the first embodiment.

In S47, the blurred image is output.

The image-pickup apparatus according to the fourth embodiment can shape the blur shape in the area sufficiently apart from the in-focus position into a good blur shape.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The image processing method according to the present invention is applicable to an application of image processing configured to blur a captured image.

The present invention can provide an image processing method, an image processing apparatus, a non-transitory computer-readable medium, and an image-pickup apparatus, which can generate a satisfactorily image.

This application claims the benefit of Japanese Patent Application No. 2013-019474, filed Feb. 4, 2013, which is hereby incorporated by reference herein in its entirety.

What is claimed is:

1. A non-transitory computer-readable medium for storing a program configured to enable a computer to execute:
   an estimation step of estimating a brightness value in a brightness saturation part based upon a first image having the brightness saturation part obtained through capturing an object via an optical system, and a second image obtained through capturing the object via the optical system with a different exposure amount; and
   a blurring step of blurring the brightness saturation part in the first image based upon the brightness value estimated by the estimation step.

2. The non-transitory computer-readable medium according to claim 1, further comprising an adjustment step of adjusting the brightness value in the first image based upon the distance information of the object.

3. The non-transitory computer-readable medium according to claim 1, wherein the second image has a brightness value in a area corresponding to the brightness saturation part equal to or smaller than a saturation value.

4. The non-transitory computer-readable medium according to claim 1, wherein in the estimation step, a brightness value in the brightness saturation part of the first image is estimated by using an exposure amount of the first image, an exposure amount of the second image, and a brightness value in an area corresponding to the brightness saturation part in the second image.

5. The non-transitory computer-readable medium according to claim 1, wherein the blurring step adds a blur based upon the distance information of the object contained in the brightness saturation part.

6. An image processing method comprising:
   an estimation step of estimating a brightness value in a brightness saturation part based upon a first image having the brightness saturation part obtained through capturing an object via an optical system, and a second image obtained through capturing the object via the optical system with a different exposure amount; and
   a blurring step of blurring the brightness saturation part in the first image based upon the brightness value estimated by the estimation step.

7. An image processing apparatus, comprising:
   an estimator configured to estimate a brightness value in a brightness saturation part based upon a first image having the brightness saturation part obtained through capturing an object via an optical system, and a second image obtained through capturing the object via the optical system with a different exposure amount; and
   a blurring processor configured to blur the brightness saturation part in the first image based upon the brightness value estimated by the estimator.

8. An image-pickup apparatus, comprising:
   an imaging optical system configured to form an optical image of an object;
   an image sensor configured to perform a photoelectric conversion for the optical image formed by the imaging optical system; and
   an image processor configured to estimate a brightness value in a brightness saturation part based upon a first image having the brightness saturation part obtained through capturing the object via the imaging optical system, and a second image obtained through capturing the object via the imaging optical system with a different exposure amount, and to blur the brightness saturation part in the first image based upon the brightness value that has been estimated.

* * * * *